(12) United States Patent
Zhou et al.

(10) Patent No.: US 10,299,215 B2
(45) Date of Patent: May 21, 2019

(54) RELAY APPARATUS

(71) Applicant: DENSO CORPORATION, Kariya, Aichi-pref. (JP)

(72) Inventors: Zhuomin Zhou, Kariya (JP); Yoshifumi Kaku, Kariya (JP)

(73) Assignee: DENSO CORPORATION, Kariya (JP)

( * ) Notice: Subject to any disclaimer, the term of this patent is extended or adjusted under 35 U.S.C. 154(b) by 99 days.

(21) Appl. No.: 15/683,888

(22) Filed: Aug. 23, 2017

(65) Prior Publication Data

US 2018/0115956 A1    Apr. 26, 2018

(30) Foreign Application Priority Data

Oct. 25, 2016    (JP) .................................. 2016-208703

(51) Int. Cl.
*H04W 52/02*    (2009.01)

(52) U.S. Cl.
CPC ... *H04W 52/0274* (2013.01); *H04W 52/0206* (2013.01); *H04W 52/0216* (2013.01); *H04W 52/0219* (2013.01); *H04W 52/0232* (2013.01); *H04W 52/0235* (2013.01); *Y02D 70/00* (2018.01); *Y02D 70/142* (2018.01)

(58) Field of Classification Search
CPC . H04W 7/14; H04W 52/028; H04W 52/0267; H04W 52/0274; H04W 52/0296; H04W 40/02; H04W 40/005
See application file for complete search history.

(56) References Cited

U.S. PATENT DOCUMENTS

| 10,171,157 B2 * | 1/2019 | Zhou ........................ H04B 7/14 |
| 2014/0293342 A1 * | 10/2014 | Tsutsumi ................ G06F 3/126 |
| | | 358/1.15 |
| 2017/0367144 A1 * | 12/2017 | Zhou ........................ H04B 1/52 |

FOREIGN PATENT DOCUMENTS

JP    2012-10261 A    1/2012

* cited by examiner

*Primary Examiner* — Hanh N Nguyen (74) *Attorney, Agent, or Firm* — Posz Law Group, PLC (57) ABSTRACT

A relay apparatus includes multiple ports, a switch section, multiple physical layer (PHY) sections, a first control section, and a second control section. Each of the ports transmits or receives a frame. The first control section switches a subject PHY section, which is one of the multiple PHY sections and corresponds to the port receiving the frame, from an off state to an on state when the switch section is in an off state and each of the multiple PHY sections is in an off state. The second control section switches the switch section from the off state to an on state when (i) the subject PHY section is switched from the off state to the on state, (ii) the switch section is in the off state, and (iii) the multiple PHY sections except for the subject PHY section are in the off states.

6 Claims, 5 Drawing Sheets

| GROUP A | GROUP B | ... |
|---------|---------|-----|
| 1-1 | 1-3 | ... |
| 1-2 | 1-4 | ... |
| 1-3 | 2-2 | ... |
| 2-1 | 2-3 | ... |
| 2-2 | 2-4 | ... |
| ⋮ | ⋮ | ⋱ |

RELAY APPARATUS

CROSS REFERENCE TO RELATED APPLICATION

This application is based on Japanese Patent Application No. 2016-208703 filed on Oct. 25, 2016, the disclosure of which is incorporated herein by reference.

TECHNICAL FIELD

The present disclosure relates to a relay apparatus.

BACKGROUND

As described in JP 2012-10261 A, in a relay apparatus, during a power-saving operation, a wireless Local Area Network (LAN) connection section of wide area network (WAN) side, a cellphone connection section of WAN side, a memory section, and a control section are maintained in off states, and a LAN connection section of LAN side and a connection request detection section are maintained in operation states. During the power-saving operation, the connection request detection section monitors whether a connection request is received from a wireless LAN terminal via the LAN connection section of LAN side. When the connection request detection section receives the connection request from the wireless LAN terminal, the off-state sections including the control section are activated, and start normal operation.

SUMMARY

In the above-described related art, during a power-saving operation, the LAN connection section of LAN side which transmits and receives data is maintained in on state, even though the data transmission or data reception is not performed. So, reduction effect of electric power consumption is not enough.

It is an object of the present disclosure to provide a relay apparatus which can effectively reduce the electric power consumption.

According to an aspect of the present disclosure, a relay apparatus includes multiple ports, a switch section, multiple physical layer (PHY) sections, a first control section, and a second control section.

Each of the multiple ports transmits or receives a frame. The switch section has a relay execution section, and switches between a first on state and a first off state. The relay execution section selects a relay destination of a reception frame from the multiple ports based on a transmission destination of the reception frame when the reception frame is received by a reception port that is one of the multiple ports. The relay execution section transmits the reception frame to the transmission destination through the relay destination as a relay process. In the first on state, the relay execution section is capable of executing the relay process. In the first off state, the relay execution section is incapable of executing the relay process.

The multiple PHY sections connected to the multiple ports in one to one manner. Each multiple PHY section has a communication execution section and switches between a second on state and a second off state. The communication execution section executes a reception operation and a transmission operation. The communication execution section acquires a reception data included in the reception frame based on a communication signal received by the one of the multiple ports and outputs the reception data to the switch section in the reception operation. The communication execution section converts a data transmitted from the switch section to another communication signal to be transmitted through a communication line in the transmission operation. In the second on state, the communication execution section is capable of executing the reception operation and the transmission operation. In the second off state, the communication execution section is incapable of executing the reception operation and the transmission operation.

The first control section switches a subject PHY section, which is one of the multiple PHY sections and corresponds to the reception port, from the second off state to the second on state when the switch section is in the first off state and each the PHY section is in the second off state.

The second control section switches the switch section from the first off state to the first on state when (i) the subject PHY section is switched from the second off state to the second on state, (ii) the switch section is in the first off state, and (iii) the multiple PHY sections except for the subject PHY section are in the second off states.

In the above relay apparatus, when the data starts to be transmitted and received, each of the PHY section and the switch section is shifted from the off state to the on state. During a power-saving operation, when the data is not transmitted and received, the multiple PHY sections are capable of shifting from the on states to the off states along with the switch section. With this configuration, electric power consumption can be reduced by turning off the multiple PHY sections and the switch section.

Thus, the electric power consumption of the relay apparatus can be effectively reduced.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, respective embodiments will be described with reference to the drawings.

First Embodiment

Figure 1:
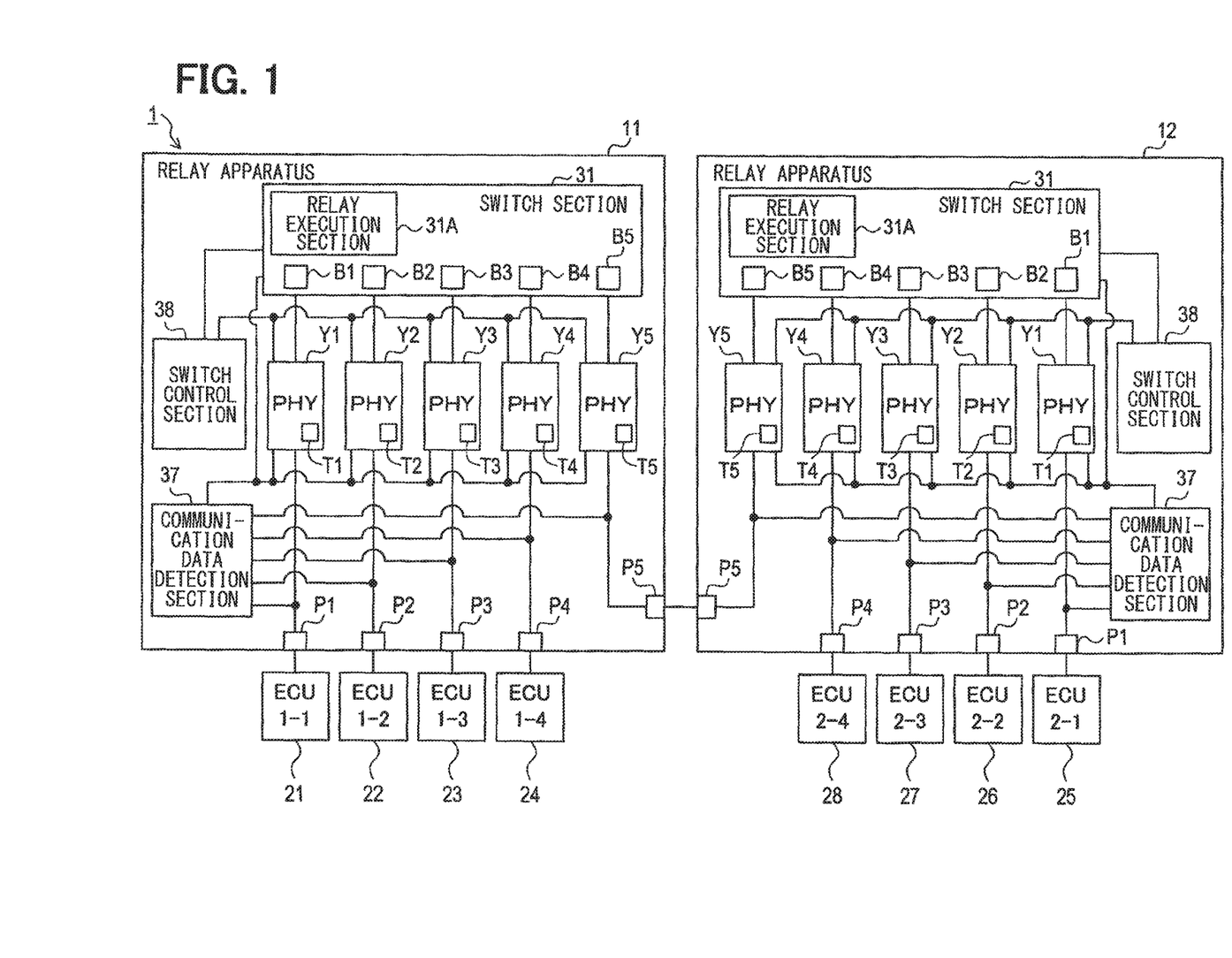
FIG. 1 is a diagram showing a configuration of a communication network.

As shown in FIG. 1, a communication network 1 is defined as, for example, Ethernet Network mounted on a vehicle, like a passenger car. The communication network 1 configures a communication system in the vehicle. Herein, Ethernet is a registered trademark.

As shown in FIG. 1, the communication network 1 includes relay apparatuses 11, 12 and electronic control units (ECUs) 21 to 28.

Each of the relay apparatuses 11, 12 functions as an Ethernet switch and performs a communication relay operation for the ECUs 21 to 28. The relay apparatus 11 and the relay apparatus 12 have the same configuration. Hereinafter, the relay apparatus 11 will be described as an example.

The relay apparatus 11 includes five ports P1 to P5 each of which transmits and receives a frame. The ports P1 to P4 of the relay apparatus 11 are connected to the ECUs 21 to 24 via communication lines, respectively. The port P5 of the relay apparatus 11 is connected to a port P5 of the relay apparatus 12 via a communication line.

In the relay apparatus 11, the ports Pi are disposed corresponding to respective physical layer (PHY) sections Yi. Hereinafter, the ports P1 to P5 are indicated by Pi, the PHY sections Y1 to Y5 are indicated by Yi, and i represents an integer within a range of 1 to 5. The port Pi is connected to the corresponding PHY section Yi via the communication line. The PHY section Yi executes a transmission operation and a reception operation. As the transmission operation, the PHY section converts data from a switch section 31 to a communication signal to be transmitted through the communication line, and outputs the converted communication signal to the port corresponding to the PHY section. As the reception operation, the PHY section converts the communication signal, which is input from the port corresponding to the PHY section, to reception data, and outputs the converted reception data to the switch section 31. The PHY section Yi is a transceiver, and is configured by a hardware circuit.

Each PHY section Yi has a communication execution section Ti which executes the transmission operation and the reception operation. The PHY section is capable of switching between an on state and an off state. During the on state, the communication execution section Ti is capable of executing the transmission operation and the reception operation. During the off state, the communication execution section Ti is incapable of executing the transmission operation and the reception operation. When the PHY section Yi receives a switching instruction that instructs a switch from the off state to the on state, the off state is switched to the on state. When the PHY section Yi receives a switching instruction that instructs a switch from the on state to the off state, the on state is switched to the off state. The off state of the PHY section corresponds to a second off state, and the on state of the PHY section corresponds to a second on state. The PHY section Yi transmits an on state signal to a switch control section 38, which will be described later. The on state signal indicates that the PHY section Yi is switched from the off state to the on state.

The relay apparatus 11 includes the switch section 31. The switch section 31 executes a relay process. The relay process is executed according to the Ethernet standard. The switch section 31 selects one of the PHY sections as a relay destination of the reception frame based on a transmission destination of the reception frame. Herein, the reception frame is received via one of the multiple ports. After selecting the PHY section, the switch section 31 transmits the reception frame from the selected PHY section. The reception frame stores destination information about the transmission destination of the frame. The switch section 31 is capable of specifying which ECU is set as the transmission destination of the frame by referring to the destination information.

The switch section 31 has a relay execution section 31A that executes the relay process. The switch section 31 is capable of switching between the on state, in which the relay process is executable by the relay execution section 31A, and the off state, in which the relay process is not executable by the relay execution section 31A. In the off state of the switch section 31, when receiving the switching instruction that instructs a switch from the off state to the on state, the switch section 31 switches from the off state to the on state. In the on state of the switch section 31, when receiving the switching instruction that instructs a switch from the on state to the off state, the switch section 31 switches from the on state to the off state. The off state of the switch section 31 corresponds to a first off state, and the on state of the switch section 31 corresponds to a first on state.

The switch section 31 transmits a third turn-on instruction to the PHY section. The third turn-on instruction is a signal that instructs a switch from the off state to the on state.

The switch section 31 stores an operation state of each of the ECUs 21 to 24 connected to the relay apparatus 11. Herein, the operation state is the off state or the on state. The switch section 31 has buffers Bi corresponding to respective ports Pi and respective PHY sections Yi. Each PHY section Yi is connected to the corresponding buffer Bi via the communication line. A part of an area of the buffer Bi is employed as a reception buffer storing reception data. A part of or all area of the buffer Bi which is a rest of the reception buffer is employed as a transmission buffer storing transmission data.

Figure 2:
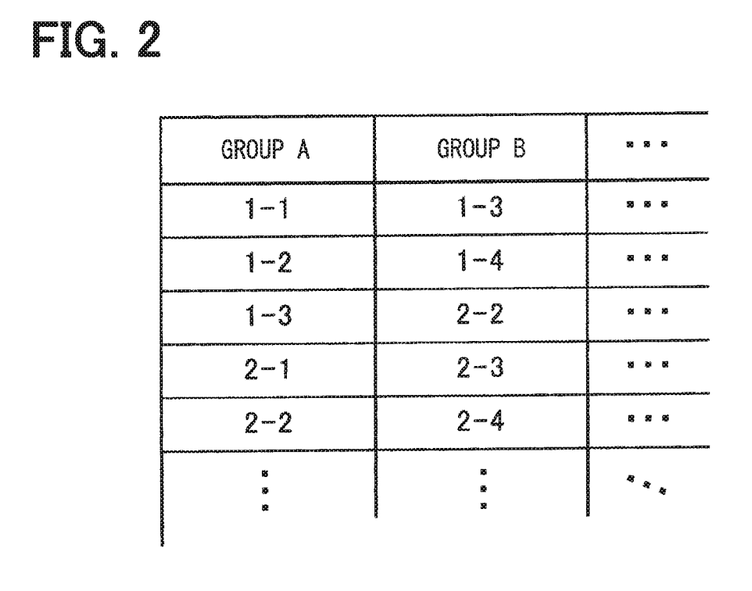
FIG. 2 is a diagram showing a group table.

The switch section 31 stores a media access control (MAC) address table and a group table. The MAC address table stores MAC addresses of respective ECUs that are connected to the respective ports of the relay apparatus 11. As shown in FIG. 2, the group table stores grouping information indicating which ECUs are preliminarily registered as one group. For example, in FIG. 2, group A includes ECU 1-1, ECU 1-2, ECU 1-3, ECU 2-1, and ECU 2-2.

The switch section 31 is configured by, for example, a digital circuit that includes multiple logic circuits. The switch section 31 may also be achieved by a combination of a digital circuit and an analog circuit. The switch section 31 may be mainly configured by a publicly known microcomputer having a central processing unit (CPU) and a semiconductor memory, for example, a random access memory (RAM), a read-only memory (RAM), a flash memory. In this case, each kind of functions of switch section 31 is achieved with the CPU executing a program stored in a non-transitory tangible storage medium. The semiconductor memory corresponds to the non-transitory tangible storage medium storing the program. When the program is executed, an operation is performed corresponding to the program. One or more microcomputer may configure the switch section 31.

The relay apparatus 11 includes a communication data detection section 37. The communication data detection section 37 is connected to the five communication lines by which the five ports Pi and the respective PHY sections Yi are connected. The communication data detection section 37 detects the frame transmitted to one of the PHY sections Yi. The communication data detection section 37 is connected to the PHY section Yi via the communication line. The communication data detection section 37 transmits a first turn-on instruction to the PHY section corresponding to the port that detects the frame. The first turn-on instruction is a signal that requests the PHY section to switch from the off state to the on state.

The communication data detection section 37 corresponds to a first control section. The relay apparatus 11 includes the switch control section 38. The switch control section 38 is connected to the PHY sections Yi via the respective communication lines. The switch control section 38 is connected to the switch section 31 via the communication line. The switch control section 38 transmits a second turn-on instruction to the switch section 31. The second turn-on instruction is a signal that requests the switch section 31 to switch from the off state to the on state.

The switch control section 38 corresponds to a second control section.

The processes executed by the relay apparatus 11 will be described with reference to the flowcharts in FIG. 3 to FIG. 9.

Figure 3:
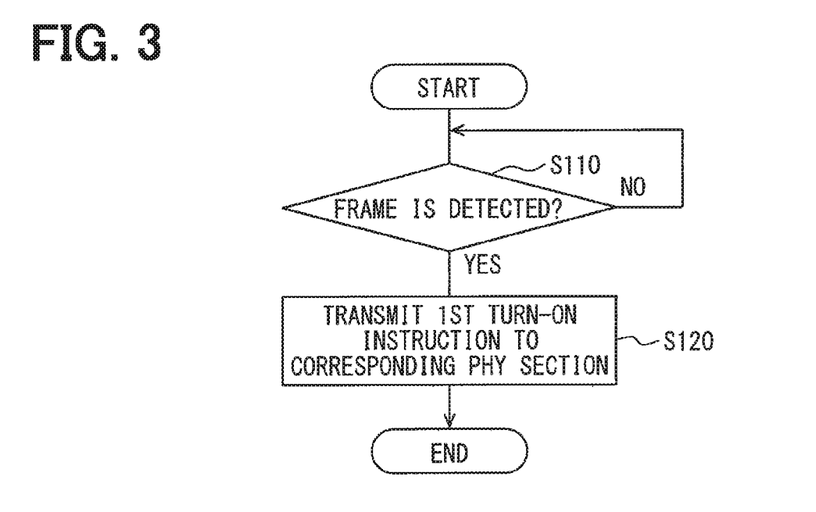
FIG. 3 is a flowchart showing a first wake-up process.

A first wake-up process executed by the communication data detection section 37 will be described with reference to the flowchart in FIG. 3.

During a power-on state of the relay apparatus 11, the communication data detection section 37 repeatedly executes the first wake-up process. The communication data detection section 37 determines whether the frame is detected by one of the ports in S110. For example, when detecting a preamble that is transmitted immediately before the transmission of the frame, the communication data detection section 37 determines that the frame is detected by one of the ports. When the communication data detection section 37 determines that the frame is detected, the flowchart is shifted to S120. When the communication data detection section 37 determines no frame is detected, the communication data detection section 37 repeatedly executes S110 until detecting the frame.

In S120, the communication data detection section 37 specifies the PHY section that corresponds to the port in which the frame is detected, and transmits the first turn-on instruction to the specified PHY section. Thereafter, the process ends.

Figure 4:
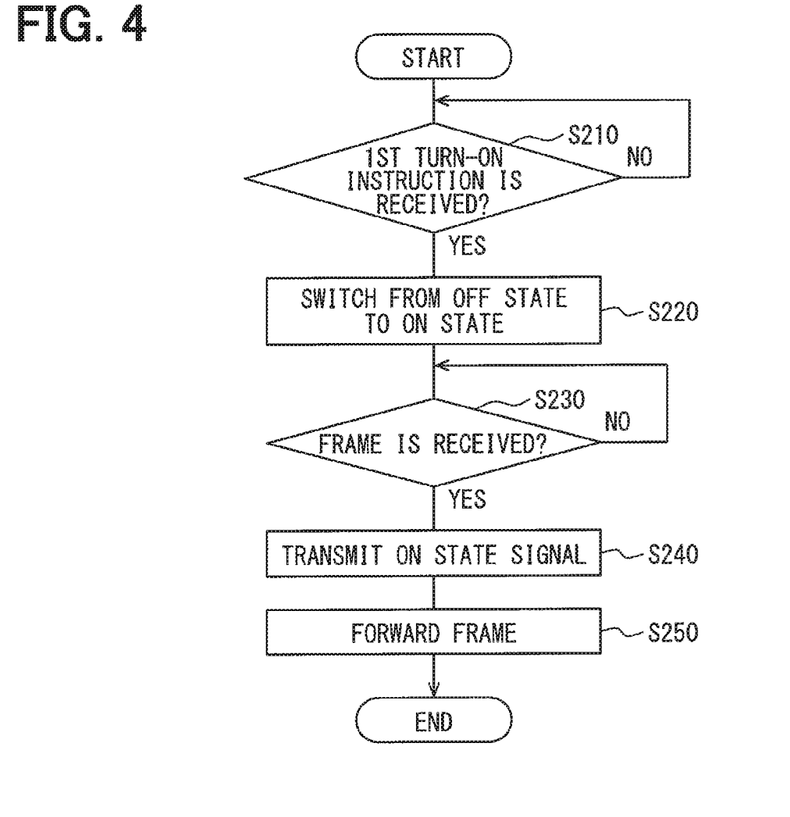
FIG. 4 is a flowchart showing a second wake-up process.

A second wake-up process executed by the PHY section will be described with reference to the flowchart in FIG. 4.

During the power-on state of the relay apparatus 11 and the off state of each PHY section, the second wake-up process is executed by each of the PHY sections. The PHY section determines whether the first turn-on instruction is received in S210. When the PHY section determines that the first turn-on instruction is received, the flowchart is shifted to S220. When the PHY section determines that the first turn-on instruction is not received, the PHY section waits in S210 until receiving the first turn-on instruction.

The PHY section shifts from the off state to the on state in S220. Thereafter, the flowchart is shifted to S230. The PHY section determines whether the frame is received in S230. When the PHY section determines that the frame is received, the flowchart is shifted to S240. When the PHY section determines that the frame is not received, the PHY section repeatedly executes S230 until receiving the frame.

The PHY section transmits the on state signal to the switch control section 38 in S240. Thereafter, the flowchart is shifted to S250. The PHY section forwards the received frame to the switch section 31 in S250. Thereafter, the process ends.

Figure 5:
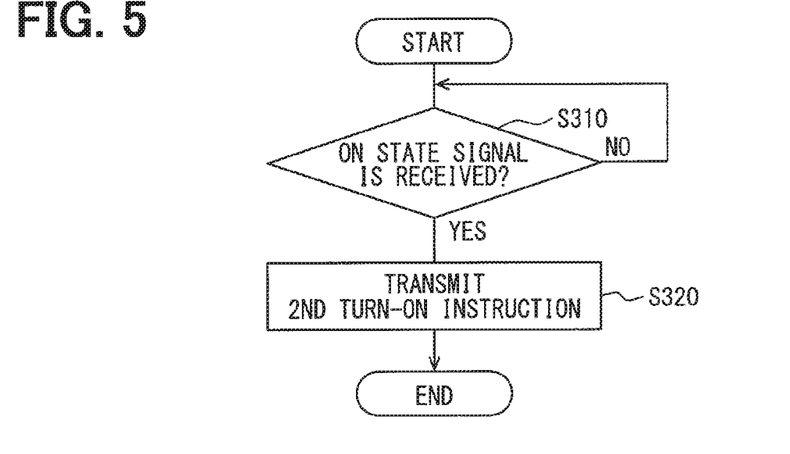
FIG. 5 is a flowchart showing a third wake-up process.

A third wake-up process executed by the switch control section 38 will be described with reference to the flowchart in FIG. 5.

During the power-on state of the relay apparatus 11, the switch control section 38 repeatedly executes the third wake-up process. The switch control section 38 determines whether the on state signal is received in S310. When the switch control section 38 determines that the on state signal is received, the flowchart is shifted to S320. When the switch control section 38 determines that the on state signal is not received, the switch control section 38 repeatedly executes S310 until receiving the on state signal.

The switch control section 38 transmits the second turn-on instruction to the switch section 31 in S320. Thereafter, the process ends.

Figure 6:
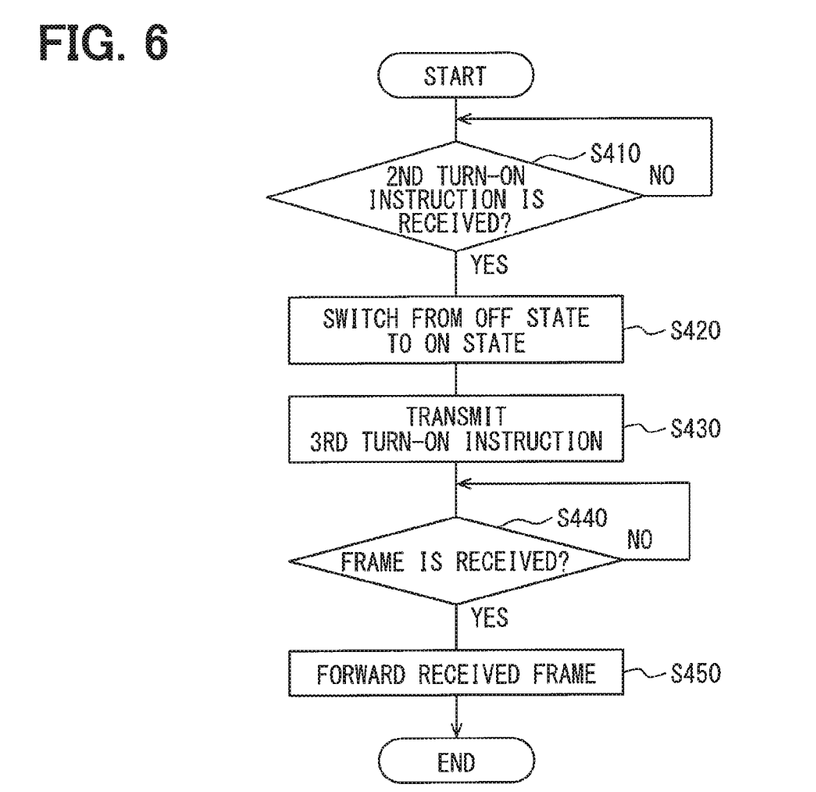
FIG. 6 is a flowchart showing a fourth wake-up process.

A fourth wake-up process executed by the switch section 31 will be described with reference to the flowchart in FIG. 6.

During the power-on state of the relay apparatus 11 and the off state of the switch section 31, the switch section 31 executes the fourth wake-up process. The switch section 31 determines whether the second turn-on instruction is received in S410. When the switch section 31 determines that the second turn-on instruction is received, the flowchart is shifted to S420. When the switch section 31 determines that the second turn-on instruction is not received, the switch section 31 waits in S410 until receiving the second turn-on instruction.

The switch section 31 switches from the off state to the on state in S420. Thereafter, the flowchart is shifted to S430. In S430, the switch section 31 specifies all of the ECUs included in the same group with the destination ECU by referring to the group table. Herein, the destination ECU is the ECU defined as the transmission destination in the frame. When each of the specified ECUs including the destination ECU is connected to the port of the relay apparatus 11 that receives the frame, the switch section 31 transmits the third turn-on instruction to the PHY section that is connected via the communication line to the port corresponding to each specified ECU. When at least one of the specified ECUs is connected to the port of another relay apparatus 12 different from the relay apparatus 11 that receives the frame, the switch section 31 transmits the third turn-on instruction to the PHY section that is connected to the port of another relay apparatus 12 via the communication line. In an example shown in FIG. 1, when at least one of the specified ECUs is connected to the port of relay apparatus 12, the switch section 31 of the relay apparatus 11 transmits the third turn-on instruction to the PHY section Y5 that is connected to the port 5 of the relay apparatus 12 through the port 5 of the relay apparatus 11. Thereafter, the flowchart is shifted to S440.

The switch section 31 determines whether the frame is received in S440. When the switch section 31 determines that the frame is received, the flowchart is shifted to S450. When the switch section 31 determines that no frame is received, the switch section 31 repeatedly executes S440 until receiving the frame.

In S450, the switch section 31 forwards the received frame as the relay process. Thereafter, the process ends.

Figure 7:
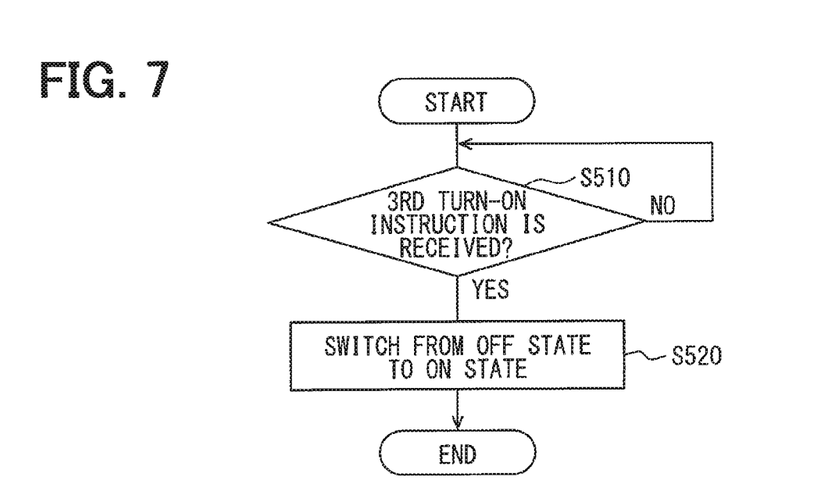
FIG. 7 is a flowchart showing a fifth wake-up process.

A fifth wake-up process executed by the PHY section will be described with reference to the flowchart in FIG. 7.

During the power-on state of the relay apparatus 11 and the off state of the PHY section, the fifth wake-up process is executed by each of the PHY sections. The PHY section determines whether the third turn-on instruction is received in S510. When the PHY section determines that the third turn-on instruction is received, the flowchart is shifted to S520. When the PHY section determines that the third turn-on instruction is not received, the PHY section waits in S510 until receiving the third turn-on instruction.

The PHY section switches from the off state to the on state in S520. Thereafter, the process ends.

Figure 8:
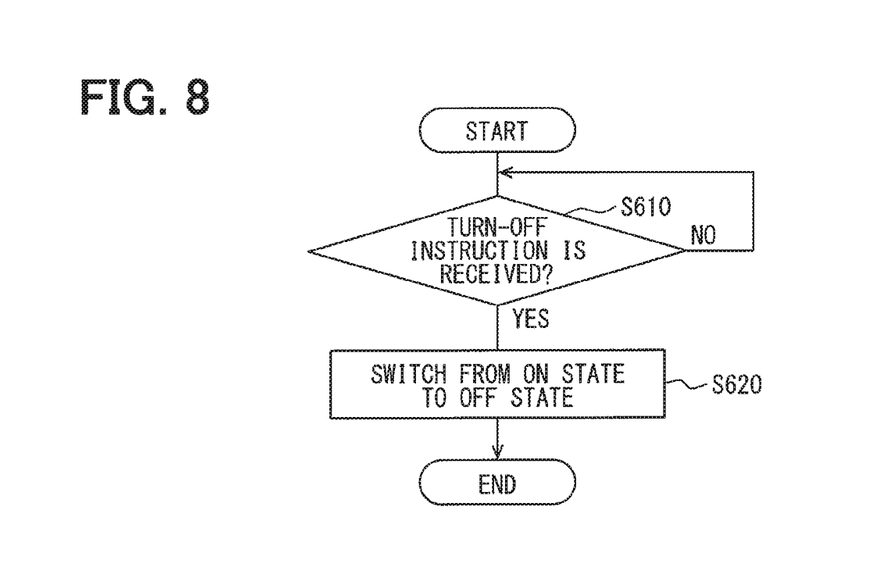
FIG. 8 is a flowchart showing a first sleep process.

A first sleep process executed by the PHY section will be described with reference to the flowchart in FIG. 8.

During the power-on state of the relay apparatus 11 and the on state of at least one PHY section, each of the at least one PHY section executes the first sleep process. The PHY section determines whether a turn-off instruction is received from the switch section 31 in S610. The turn-off instruction is a signal that requests the PHY section to switch from the on state to the off state. When the PHY section determines that the turn-off instruction is received, the flowchart is shifted to S620. When the PHY section determines the turn-off instruction is not received, the PHY section repeatedly executes S610 until receiving the turn-off instruction.

The PHY section switches from the on state to the off state in S620. Thereafter, the process ends.

Figure 9:
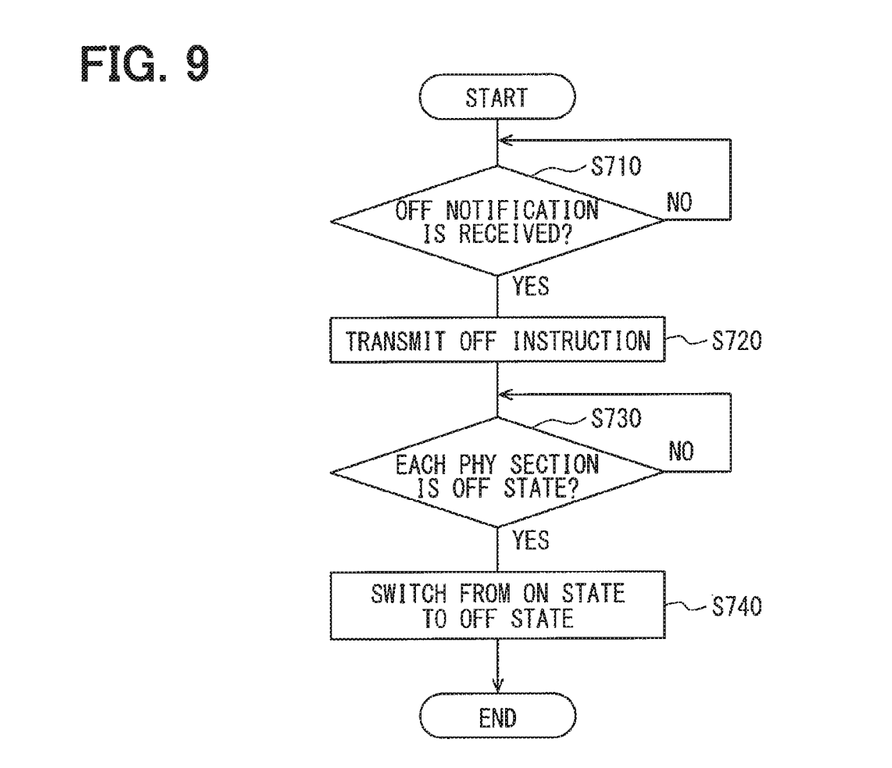
FIG. 9 is a flowchart showing a second sleep process.

A second sleep process executed by the switch section 31 will be described with reference to the flowchart in FIG. 9.

During the power-on state of the relay apparatus 11 and the on state of the switch section 31, the switch section 31 executes the second sleep process. The switch section 31 determines whether an off notification is received from the ECU in S710. The off notification is a frame that stores information for notifying that the ECU has switched from the on state to the off state. The off notification is one kind of predetermined frame transmitted from the ECU. When the switch section 31 determines that the off notification is received, the flowchart is shifted to S720. When the switch section 31 determines that the off notification is not received, the switch section 31 repeatedly executes S710 until receiving the off notification.

In S720, the switch section 31 specifies ECUs included in the same group as the transmission source ECU of the off notification frame by referring to the group table. Then, the switch section 31 transmits an off instruction to the PHY sections connected to the specified ECUs via the respective communication lines. Thereafter, the flowchart is shifted to S730.

The switch section 31 determines whether each of the PHY sections of the relay apparatus 11 is in the off state. When the switch section 31 determines that all of the PHY sections included in the relay apparatus 11 are in the off states, the flowchart is shifted to S740. When the switch section 31 determines that at least one PHY section of the relay apparatus 11 is still in the on state, the switch section 31 repeatedly executes S730 until all of the PHY sections switch to off states.

The switch section 31 shifts from the on state to the off state in S740. Thereafter, the flowchart ends.

The present embodiment provides the following advantages.

During the off state of the switch section 31 and the off state of each PHY section, when detecting the frame, the communication data detection section 37 transmits the first turn-on instruction to the PHY section corresponding to the port at which the frame is detected. When receiving the first turn-on instruction, the PHY section switches from the off state to the on state, and transmits the on state signal to the switch control section 38. When receiving the on state signal, the switch control section 38 transmits the second turn-on instruction to the switch section 31. When receiving the second turn-on instruction, the switch section 31 switches from the off state to the on state.

With this configuration, in response to a start of data transmission and data reception, the PHY section Yi and the switch section 31 switch from the off states to the on states. Further, during the power-saving operation while the data is not transmitted and received, the PHY section Yi is capable of switching from the on state to the off state along with the switch section 31. With this configuration, electric consumption can be effectively reduced by turning off the PHY sections Yi and the switch section 31.

Thus, the electric consumption of the relay apparatus 11, 12 can be further reduced.

OTHER EMBODIMENTS

The present disclosure is not limited to the embodiment described above and can be properly modified and expanded within the spirit and scope of the present disclosure.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

Other than the above-described relay apparatus, the present disclosure may be achieved by various configurations, such as, a communication system including the relay apparatus as a component, a program that controls a computer to operate as a relay apparatus, a non-transitory tangible storage semiconductor memory storing the program, a relaying method and the like.

What is claimed is:

1. A relay apparatus comprising:
   a plurality of ports each of which transmits or receives a frame;
   a switch section having a relay execution section, and switching between a first on state and a first off state, wherein
      the relay execution section selects a relay destination of a reception frame from the plurality of ports based on a transmission destination of the reception frame when the reception frame is received by a reception port that is one of the plurality of ports, and the relay execution section transmits the reception frame to the transmission destination through the relay destination as a relay process,
      in the first on state, the relay execution section is capable of executing the relay process, and
      in the first off state, the relay execution section is incapable of executing the relay process;
   a plurality of physical layer sections connected to the plurality of ports in one to one manner, each of the plurality of physical layer sections having a communication execution section and switching between a second on state and a second off state, wherein
      the communication execution section executes a reception operation and a transmission operation, the communication execution section acquires a reception data included in the reception frame based on a communication signal received by the one of the plurality of ports and outputs the reception data to the switch section in the reception operation, and the communication execution section converts a data transmitted from the switch section to another communication signal to be transmitted through a communication line in the transmission operation,
      in the second on state, the communication execution section is capable of executing the reception operation and the transmission operation, and
      in the second off state, the communication execution section is incapable of executing the reception operation and the transmission operation;
   a first control section switching a subject physical layer section, which is one of the plurality of physical layer sections and corresponds to the reception port, from the second off state to the second on state when the switch section is in the first off state and each of the plurality of physical layer sections is in the second off state; and a second control section switching the switch section from the first off state to the first on state when (i) the subject physical layer section is switched from the second off state to the second on state, (ii) the switch section is in the first off state, and (iii) the plurality of physical layer sections except for the subject physical layer section are in the second off states.

2. The relay apparatus according to claim 1, wherein the switch section specifies one or more nodes included in a same group with a node set as the transmission destination, and the switch section switches each of the plurality of physical layer sections, which is connected to each of the one or more nodes or the node set as the transmission destination via a communication line, from the second off state to the second on state.

3. The relay apparatus according to claim 2, wherein the switch section stores a group table preliminarily defining one or more groups each of which includes at least one node, and the switch section determines each of the plurality of physical layer sections, which is to be switched from the second off state to the second on state, with reference to the group table.

4. The relay apparatus according to claim 1, wherein, when the reception frame received by the reception port is a predetermined frame notifying a switch-off, the switch section specifies one or more nodes included in a same group with a node connected to the reception port via a communication line, and the switch section switches each of the plurality of physical layer sections, which is connected to each of the one or more nodes or the node connected to the reception port, from the second on state to the second off state.

5. The relay apparatus according to claim 4, wherein the switch section stores a group table preliminarily defining one or more groups each of which includes at least one node, and the switch section determines each of the plurality of physical layer sections, which is to be switched from the second on state to the second off state, with reference to the group table.

6. The relay apparatus according to claim 1, wherein the switch section switches from the first on state to the first off state when all of the plurality of physical layer sections are in the second off states.

* * * * *